US011799068B2

(12) United States Patent
Nam (10) Patent No.: US 11,799,068 B2
(45) Date of Patent: Oct. 24, 2023

(54) MULTILAYER ELECTRODE AND METHOD OF MANUFACTURING SAME

(71) Applicant: LG ENERGY SOLUTION, LTD., Seoul (KR)

(72) Inventor: Yejin Nam, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/990,651

(22) Filed: Nov. 18, 2022

(65) Prior Publication Data

US 2023/0078818 A1    Mar. 16, 2023

Related U.S. Application Data

(62) Division of application No. 16/603,485, filed as application No. PCT/KR2018/014851 on Nov. 28, 2018, now Pat. No. 11,563,205.

(30) Foreign Application Priority Data

Nov. 30, 2017   (KR) .......................... 10-2017-0163157
Nov. 27, 2018   (KR) .......................... 10-2018-0148559

(51) Int. Cl.
  *H01M 4/133*   (2010.01)
  *H01M 4/134*   (2010.01)
  (Continued)

(52) U.S. Cl.
  CPC ......... *H01M 4/133* (2013.01); *H01M 4/0404* (2013.01); *H01M 4/131* (2013.01);
  (Continued)

(58) Field of Classification Search
  CPC ...... H01M 4/133; H01M 4/134; H01M 4/621; H01M 10/0525
  See application file for complete search history.

(56) References Cited

U.S. PATENT DOCUMENTS

| 2007/0026312 | A1 | 2/2007 | Imachi et al. |
| 2014/0363736 | A1 | 12/2014 | Kim et al. |
| 2016/0351892 | A1 | 12/2016 | Sugimori et al. |
| 2017/0125806 | A1 | 5/2017 | Wang et al. |
| 2018/0006291 | A1 | 1/2018 | Kim et al. |
| 2019/0305308 | A1* | 10/2019 | Lee ........................ H01M 4/133 |

FOREIGN PATENT DOCUMENTS

| CN | 1905247 A | 1/2007 |
| CN | 106797020 A | 5/2017 |

(Continued)

OTHER PUBLICATIONS

Machine translation of KR 20170075963 (2017).
European Search Report issued in corresponding European Patent Application No. 22207924.6 dated Jan. 31, 2023.

*Primary Examiner* — Jonathan G Jelsma
(74) *Attorney, Agent, or Firm* — Morgan, Lewis & Bockius LLP (57) ABSTRACT

The present disclosure relates to a multilayer electrode and a method of manufacturing the same, and more specifically to a multilayer electrode comprising an electrode collector; and two or more electrode active material layers which are sequentially coated on one surface or both surfaces of the electrode current collector, wherein the electrode active material layers each include a carbon-based material, a binder, and a silicon-based material, wherein in the mutually adjacent electrode active material layers based on the direction of formation of the electrode active material layers, the content of the carbon-based material and the content of the binder in the electrode active material layer located relatively close to the electrode collector are larger than the content of the carbon-based material and the content of the binder in the electrode active material layers located relatively far away from the electrode current collector.

15 Claims, 3 Drawing Sheets

(51) Int. Cl.
    *H01M 4/62*      (2006.01)
    *H01M 10/0525*   (2010.01)
    *H01M 50/204*    (2021.01)
    *H01M 4/04*      (2006.01)
    *H01M 4/131*     (2010.01)
    *H01M 4/1393*    (2010.01)
    *H01M 4/1395*    (2010.01)
    *H01M 4/02*      (2006.01)

(52) U.S. Cl.
    CPC ......... *H01M 4/134* (2013.01); *H01M 4/1393* (2013.01); *H01M 4/1395* (2013.01); *H01M 4/621* (2013.01); *H01M 10/0525* (2013.01); *H01M 50/204* (2021.01); *H01M 2004/027* (2013.01)

(56)　　　　　　References Cited

FOREIGN PATENT DOCUMENTS

| | | |
|---|---|---|
| JP | H09-223499 A | 8/1997 |
| JP | 09223499 A | 4/2003 |
| JP | 2007-35589 A | 2/2007 |
| JP | 2008-198596 A | 8/2008 |
| JP | 2014-120330 A | 6/2014 |
| KR | 10-2015-0014397 A | 2/2015 |
| KR | 10-2017-0075963 A | 7/2017 |
| WO | 2015/115051 A1 | 8/2015 |

\* cited by examiner

MULTILAYER ELECTRODE AND METHOD OF MANUFACTURING SAME

CROSS-REFERENCE TO RELATED APPLICATION(S)

This application is a divisional of U.S. patent application Ser. No. 16/603,485, filed on Oct. 7, 2019, which claims the benefits of filing dates of Korean Patent Application No. 10-2017-0163157 filed with Korean Intellectual Property Office on Nov. 30, 2017, and Korean Patent Application No. 10-2018-0148559 filed with Korean Intellectual Property Office on Nov. 27, 2018, the entire contents of which are incorporated herein by reference.

TECHNICAL FIELD

The present disclosure relates to a multilayer electrode and a method of manufacturing the same, and more particularly, to a multilayer electrode capable of improving the durability of the electrode and the performance of the battery, and a method of manufacturing the same.

BACKGROUND

In accordance with technological development and increased demand for various devices, demand for using secondary batteries as energy sources has rapidly increased. Among these secondary batteries, lithium secondary batteries having high energy density and voltage, long cycle life, and low self-discharge ratio are commercially available and widely used.

In such a lithium secondary battery, lithium-containing cobalt oxides ($LiCoO_2$) having a layered crystal structure, $LiMnO_2$ having a layered crystal structure, $LiMn_2O_4$ having a spinel crystal structure, and lithium-containing nickel oxides ($LiNiO_2$) are generally used as the positive electrode active material. Also, carbon materials are mainly used as negative electrode active materials. Recently, due to an increase in demand for a high-energy lithium secondary battery, the mixing use of a silicon-based material or a silicon oxide-based material having an effective capacity of ten times or higher than that of the carbon-based material is under consideration.

Figure 1:
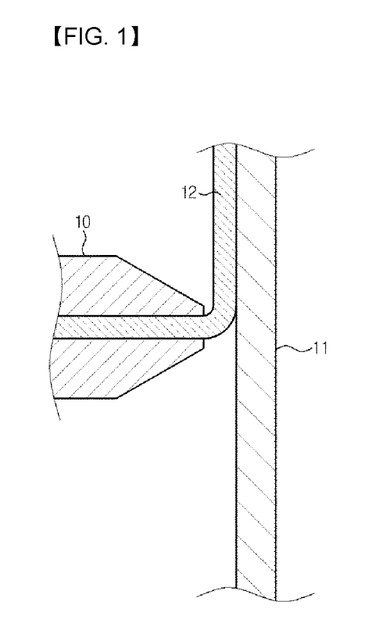
FIG. 1 is a view schematically illustrating a configuration in which a single layer of electrode active material slurry is coated by a coating die having one discharge part on an electrode current collector according to the prior art.

On the other hand, an electrode used in such a lithium secondary battery is manufactured by coating an electrode active material slurry containing an electrode active material on at least one surface of an electrode current collector and then drying it. At this time, the electrode generally includes a single electrode active material layer, and such an electrode active material layer is coated by a coating die having one discharge part. FIG. 1 is a view schematically illustrating a configuration in which a single layer 12 of electrode active material slurry is coated onto a current collector 11 by a coating die 10 having one discharge part.

However, as a high-loading electrode used for high-loading batteries is increasingly required, not only it is difficult to fabricate the electrode when manufacturing an electrode including a single electrode active material layer, but also the durability of the electrode and the performance of the battery are deteriorated, which may be problematic.

Technical Problem

Therefore, the present disclosure provides a multilayer electrode which can improve an adhesion force between the electrode active material layer and the electrode current collector, and improve rate characteristics during discharge of the battery, and a method of manufacturing the same.

Technical Solution

According to one aspect of the present disclosure, there is provided a multilayer electrode including an electrode collector; and two or more electrode active material layers which are sequentially coated on one surface or both surfaces of the electrode current collector, wherein the electrode active material layers each include a carbon-based material, a binder, and a silicon-based material, wherein in the mutually adjacent electrode active material layers based on the direction of formation of the electrode active material layers, the content of the carbon-based material and the content of the binder in the electrode active material layer located relatively close to the electrode collector are larger than the content of the carbon-based material and the content of the binder in the electrode active material layers located relatively far away from the electrode current collector, and wherein the content of the silicon-based material in the electrode active material layer located relatively far away from the electrode current collector is larger than the content of the silicon-based material in the electrode active material layer located relatively close to the electrode collector.

Here, the carbon-based material may include at least one selected from the group consisting of artificial graphite, natural graphite, hard carbon, soft carbon, carbon black, acetylene black, Ketjen black, Super-P, graphene and fibrous carbon.

Further, the silicon-based material may include at least one selected from the group consisting of $SiO_x(0 \leq x < 2)$, pure Si, and Si-alloy.

Further, the binder may include at least one selected from the group consisting of polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, and fluorine rubber.

Further, the multilayer electrode may include two to four electrode active material layers.

In a more specific example, the multilayer electrode includes the first to the $n^{th}$ electrode active material layer (wherein n is an integer of 2 to 4) including a carbon-based material and a binder in an amount that gradually decreases as farther away from the electrode current collector; and the $n^{th}$ electrode active material layer may include a carbon-based material and a binder in an amount of 0% to 99% based on the respective content (% by weight) of the carbon-based material and the binder contained in the (n−1)$^{th}$ electrode active material layer.

In the multilayer electrode according to this specific embodiment, the first to the $n^{th}$ electrode active material layers include a silicon-based material in an amount that gradually increases as farther away from the electrode current collector, the (n−1)$^{th}$ electrode active material layer may include a silicon-based material in an amount of 0% to 99% based on the content (% by weight) of the silicon-based material contained in the $n^{th}$ electrode active material layer.

Further, the multilayer electrode may be a negative electrode.

Meanwhile, according to another aspect of the present disclosure, there is provided a method of manufacturing a multilayer electrode including coating two or more layers of electrode active material slurries onto one surface or both surfaces of an electrode current collector, wherein the electrode active material slurries have different contents of constituents, and wherein each of the electrode active material slurries is simultaneously discharged through each discharge part of the die having a plurality of discharge parts to thereby form the layers of electrode active material slurries stacked in two or more layers on the electrode current collector.

Here, the layers of the electrode active material slurries each include a carbon-based material, a binder, and a silicon-based material, wherein in the layers of mutually adjacent electrode active material slurries based on the direction of formation of the layers of electrode active material slurries, the content of the carbon-based material and the content of the binder in the layers of electrode active material slurries located relatively close to the electrode collector are larger than the content of the carbon-based material and the content of the binder in the layers of electrode active material slurries located relatively far away from the electrode current collector, and wherein the content of the silicon-based material in the layers of electrode active material slurries located relatively far away from the electrode current collector is larger than the content of the silicon-based material in the layers of electrode active material slurries located relatively close to the electrode collector.

Meanwhile, according to another aspect of the present disclosure, there is provided a lithium secondary battery including: an electrode assembly including a positive electrode, a negative electrode including the multilayer electrode, and a separator interposed between the positive electrode and the negative electrode; a non-aqueous electrolyte for impregnating the electrode assembly; and a battery case incorporating the electrode assembly and the non-aqueous electrolyte.

Further, according to the present disclosure, there is provided a battery module including the lithium secondary battery of the present disclosure as a unit battery, a battery pack including the same, and a device including such a battery pack as a power source.

Here, the device may be an electric vehicle, a hybrid electric vehicle, a plug-in hybrid electric vehicle or a system for power storage.

Advantageous Effects

According to one embodiment of the present disclosure, since the content of the carbon-based material and the content of the binder in the electrode active material layer located relatively close to the electrode collector are relatively larger, the adhesion force between the electrode active material layers and the electrode current collector is improved and the durability of the electrode can be improved.

In addition, since the content of the silicon-based material in the electrode active material layer located relatively far away from the electrode current collector is relatively larger, the rate characteristics during discharge can be improved and the performance of the battery can be improved.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure should not be construed as being limited to the drawings.

DETAILED DESCRIPTION OF THE EMBODIMENTS

Hereinafter, preferred embodiments of the present disclosure will be described in detail with reference to the accompanying drawings. It should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments disclosed in the present specification and the configurations illustrated in the drawings are merely the most preferred embodiments of the present disclosure, and not all of them represent the technical ideas of the present disclosure, and thus it should be understood that there may be various equivalents and modified examples that could substitute therefore at the time of filing the present application.

The multilayer electrode according to an aspect of the present disclosure includes an electrode assembly; and two or more electrode active material layers that are sequentially coated on one surface or both surfaces of the electrode current collector, wherein the electrode active material layers each include a carbon-based material, a binder, and a silicon-based material, wherein in the mutually adjacent electrode active material layers based on the direction of formation of the electrode active material layers, the content of the carbon-based material and the content of the binder in the electrode active material layer located relatively close to the electrode collector are larger than the content of the carbon-based material and the content of the binder in the electrode active material layer located relatively far away from the electrode current collector, and wherein the content of the silicon-based material in the electrode active material layer located relatively far away from the electrode current collector is larger than the content of the silicon-based material in the electrode active material layer located relatively close to the electrode collector.

Generally, an electrode was manufactured by coating an electrode active material slurry having a single component onto an electrode current collector and then drying it.

However, as a high-loading electrode is required, when an electrode is manufactured in a conventional manner, not only the manufacture thereof is difficult, but problems such as deterioration of the electrode durability and the battery performance have occurred.

However, since the content of the carbon-based material and the content of the binder in the electrode active material layer located close to the electrode current collector are relatively large as in the multilayer electrode of the one aspect, the adhesion to the electrode current collector can be improved and the durability of the electrode can be improved. Since the content of the silicon-based material in the electrode active material layer located far away from the electrode collector becomes relatively large, the rate characteristic during discharge is improved, and the battery performance can be improved.

Here, the carbon-based material may include at least one selected from the group consisting of artificial graphite, natural graphite, hard carbon, soft carbon, carbon black, acetylene black, Ketjen black, Super-P, graphene and fibrous carbon.

Further, the silicon-based material may include at least one selected from the group consisting of $SiO_x (0 \leq x < 2)$, pure Si, and Si-alloy.

Further, the binder may include at least one selected from the group consisting of polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, and fluorine rubber. In addition, various polymeric materials that are known to be able to provide adhesion force between the electrode current collector and the electrode active material layer can be included.

In a more specific example of the multilayer electrode according to the one aspect, the multilayer electrode may include two to four layers, or two to three layers of electrode active material layers formed on an electrode current collector.

More specifically, such multilayer electrode may include the first to the $n^{th}$ electrode active material layers (wherein n is an integer of 2 to 4, or 2 to 3) containing a carbon-based material and a binder in an amount that gradually increase as farther away from the electrode current collector.

In the two to four layers, or two to three layers of the electrode active material layers sequentially stacked in this manner, an optional $n^{th}$ electrode active material layer may include a carbon-based material and a binder in a reduced amount of 0 to 99% based on the respective content (% by weight) of the carbon-based material and the binder which are contained in the $(n-1)^{th}$ electrode active material layer formed adjacent thereto and closer to the electrode current collector.

In a more specific embodiment, when two sequentially stacked electrode active material layers are formed, the second electrode active material layer may include a carbon-based material in a reduced amount of 0 to 99%, or 80 to 98%, or 90 to 97% based on the content (% by weight) of the carbon-based material which is contained in the first electrode active material layer formed adjacent thereto and closer to the electrode current collector. In addition, the second electrode active material layer may include a binder in a reduced amount of 0 to 99%, or 20 to 80%, or 40 to 60% based on the content (% by weight) of the binder which is contained in the first electrode active material layer formed adjacent thereto and closer to the electrode current collector.

Thus, since the two to four electrode active material layers each including the carbon-based material and the binder are sequentially stacked in an amount that gradually reduces as farther away from the electrode current collector, relative to the adjacent electrode active material layer, even at the high-loading electrode, the electrode active material layers can have excellent adhesion force and durability with the electrode current collector as a whole.

In addition, in the multilayer electrode described above, the first to the $n^{th}$ electrode active material layers can include a silicone-based material in an amount that gradually increases as farther away from the electrode current collector. Further, in the two to four layers, or two to three layers of the electrode active material layers sequentially stacked in this manner, an optional $(n-1)^{th}$ electrode active material layer may include a carbon-based material and a binder in an amount of 0 to 99% based on the content (% by weight) of the silicon-based material which is contained in the $n^{th}$ electrode active material layer formed adjacent thereto and far away from the electrode current collector.

In a more specific embodiment, when two sequentially stacked electrode active material layers are formed, the first electrode active material layer may include a silicon-based material in a reduced amount of 0 to 99%, or 0 to 10%, or 0 to 5% based on the content (% by weight) of the silicon-based material which is contained in the second electrode active material layer formed adjacent thereto and farther away from the electrode current collector.

Thus, since the two to four layers of the electrode active material layers including the silicon-based material are sequentially stacked in an amount that gradually increases as farther away from the electrode current collector, relative to the adjacent electrode active material layer, the rate characteristics and performance of the battery can be further improved while maintaining the above-described durability in the high-loading electrode.

The multilayer electrode according to one aspect as described above may be, for example, a negative electrode of a lithium secondary battery.

Figure 2:
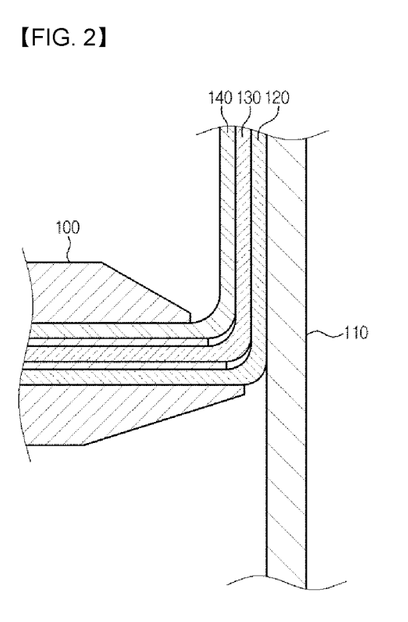
FIG. 2 is a view schematically illustrating a configuration in which three layers of electrode active material slurries are coated by a coating die having three discharge parts onto a current collector according to an embodiment of the present disclosure.
Figure 3:
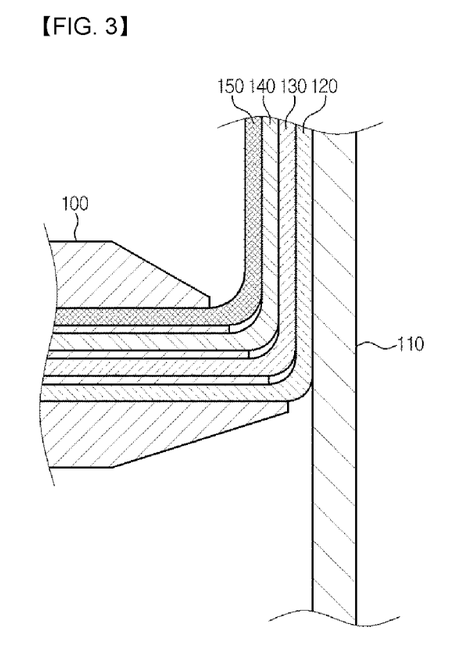
FIG. 3 is a view schematically illustrating a configuration in which four layers of electrode active material slurries are coated by a coating die having four discharge parts onto a current collector according to an embodiment of the present disclosure.

Meanwhile, FIGS. 2 and 3 schematically illustrate the configurations in which two or more electrode active material slurry layers are coated by a die having a plurality of discharge parts onto an electrode current collector according to an embodiment of the present disclosure.

Referring to FIGS. 2 and 3, the method of manufacturing a multilayer electrode according to another aspect of the present disclosure includes coating two or more electrode active material slurry layers 120, 130, 140, and 150 onto one surface or both surfaces of an electrode current collector 110, wherein the electrode active material slurries have different contents of constituents, and wherein the respective electrode active material slurries are simultaneously discharged through each discharge part of a die 100 having a plurality of discharge parts. Thus, layers of electrode active material slurries in which two or more layers, or two to four layers, or two to three layers are sequentially stacked are formed on the electrode current collector, and thereby the multilayer electrode according to the above-mentioned one aspect can be formed.

In the above figures, only three or four layers of the electrode active material slurries are illustrated, but the present disclosure is not limited thereto.

Thus, by simultaneously discharging the plurality of electrode active material slurries through one die having a large number of discharge parts to coat the layers of the electrode active material slurries, it becomes possible to easily and efficiently manufacture a high-loading electrode.

At this time, the electrode active material slurries and the layers thereof include a carbon-based material, a binder, and a silicon-based material, wherein in the mutually adjacent electrode active material slurry layers based on the direction of formation of the layers of electrode active material slurries, the content of the carbon-based material and the content of the binder in the electrode active material layers located relatively close to the electrode collector are larger than the content of the carbon-based material and the content of the binder in the layers of electrode active material slurries located relatively far away from the electrode current collector, and wherein the content of the silicon-based material in the layers of electrode active material slurries located relatively far away from the electrode current collector is larger than the content of the silicon-based material in the layers of electrode active material slurries located relatively close to the electrode collector.

Thereby, as described above, the adhesion force with the electrode current collector is improved and the durability of the electrode can be improved. Also, the rate characteristic during discharge of the battery is improved and the performance of the battery can be improved.

Meanwhile, the carbon-based material, the binder, and the silicon-based material that can be included in the electrode active material slurry and the like have been described with respect to the multilayer electrode of one aspect, and thus a further explanation thereof will be omitted.

Meanwhile, according to another aspect of the present disclosure, there is provided a lithium secondary battery including: an electrode assembly including a positive electrode, a negative electrode including the multilayer electrode of the above-mentioned one aspect, and a separator interposed between the positive electrode and the negative electrode; a non-aqueous electrolyte for impregnating the electrode assembly; and a battery case incorporating the electrode assembly and the non-aqueous electrolyte.

At this time, the positive electrode is composed of a positive electrode current collector and a positive electrode active material layer formed on at least one surface thereof.

The positive electrode active material contained in the positive electrode active material layer may include a lithium transition metal oxide expressed by the following chemical formula 1 or 2.

$$Li_xM_yMn_{2-y}O_{4-z}A_z \quad (1)$$

wherein,
M is at least one element selected from the group consisting of Al, Mg, Ni, Co, Fe, Cr, V, Ti, Cu, B, Ca, Zn, Zr, Nb, Mo, Sr, Sb, W, Ti and Bi;
A is −1 or −2 or higher valent anion;
0.9≤x≤1.2, 0<y<2, and 0≤z<0.2.

$$(1-x)LiM'O_{2-y}A_y-xLi_2MnO_{3-y'}A_{y'} \quad (2)$$

wherein,
M' is $Mn_aM_b$;
M is at least one selected from the group consisting of Ni, Ti, Co, Al, Cu, Fe, Mg, B, Cr, Zr, Zn and Period II transition metals;
A is at least one selected from the group consisting of anions such as $PO_4$, $BO_3$, $CO_3$, F and $NO_3$;
0<x<1, 0<y≤0.02, 0<y'≤0.02, 0.5≤a≤1.0, 0≤b≤0.5, a+b=1.

Meanwhile, the positive electrode active material layer may further include a binder and a conductive material.

Further, the positive electrode is manufactured by coating an electrode mixture, which is a mixture of a positive electrode active material, a conductive material and a binder, onto a portion excluding a non-coated portion of the positive electrode current collector, and if necessary, a filler may be further added to the mixture.

In addition to the lithium transition metal oxide represented by the chemical formula 1 or 2, the positive electrode active material may include layered compounds such as lithium cobalt oxide ($LiCoO_2$) or lithium nickel oxide ($LiNiO_2$) or compounds substituted with one or more transition metals; lithium manganese oxides such as the formulas $Li_{1+x}Mn_{2-x}O_4$ (wherein, x is 0 to 0.33), $LiMnO_3$, $LiMn_2O_3$, and $LiMnO_2$, lithium copper oxide ($Li_2CuO_2$), vanadium oxides such as $LiV_3O_8$, $LiFe_3O_4$, $V_2O_5$, and $Cu_2V_2O_7$; Ni-site type lithium nickel oxides represented by the formula $LiNi_{1-x}M_xO_2$ (wherein, M=Co, Mn, Al, Cu, Fe, Mg, B or Ga, x=0.01 to 0.3); lithium manganese composite oxides represented by the formula $LiMn_{2-x}M_xO_2$ (wherein, M=Co, Ni, Fe, Cr, Zn or Ta, x=0.01 to 0.1) or $Li_2Mn_3MO_8$ (wherein, M=Fe, Co, Ni, Cu or Zn); lithium manganese composite oxide having a spinel structure represented by $LiNi_xMn_{2-x}O_4$, $LiMn_2O_4$ where some of Li atoms in the formula are substituted with alkaline earth metal ions; disulfide compounds; $Fe_2(MoO_4)_3$; and the like, but are not limited thereto.

The positive electrode current collector is generally manufactured to have a thickness of 3 to 500 μm. Such positive electrode current collector is not particularly limited as long as it has high conductivity without inducing any chemical change in the battery. For example, stainless steel, aluminum, nickel, titanium, calcinated carbon, or a surface treated material of aluminum or stainless steel with carbon, nickel, titanium, silver or the like may be used. The current collector may form fine irregularities on their surface to increase the adhesion strength of the positive electrode active material, and it may be used in various shapes such as a film, a sheet, a foil, a net, a porous body, a foam, a non-woven fabric, and the like.

The conductive material is generally added in an amount of 1 to 50% by weight based on the total weight of the mixture containing the positive electrode active material. The conductive material is not particularly limited as long as it has conductivity without inducing any chemical change in the battery. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive material.

Further, the binder is a component that assists in bonding between the active material and the conductive material or the like and bonding to the current collector, and is usually added in an amount of 1 to 50% by weight based on the total weight of the mixture containing the positive electrode active material. Examples of these binders include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

Furthermore, the filler is optionally used as a component to inhibit positive electrode expansion. The filler is not particularly limited so long as it is a fibrous material that does not cause chemical changes in the battery. Examples of the filler include olefin-based polymers such as polyethylene and polypropylene; and fibrous materials such as glass fiber and carbon fiber.

On the other hand, in addition to the carbon-based material and the silicon-based material, the negative electrode may include, as a negative electrode active material, $Li_xFe_2O_3(0≤x≤1)$, $Li_xWO_2(0≤x≤1)$, $Sn_xMe_{1-x}Me'_yO_z$ (Me: Mn, Fe, Pb, Ge; Me':Al, B, P, Si, Group 1, Group 2, Group 3 elements, halogen; metal complex oxides such as $0<x≤1$; $1≤y≤3$; $1≤z≤8$); lithium metals; lithium alloys; Tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni based material; titanium oxide; lithium titanium oxide, and the like, but is not limited thereto.

Further, the negative electrode current collector constituting the negative electrode is generally manufactured to have a thickness of 3 to 500 μm. Such negative electrode current collector is not particularly limited as long as it has high conductivity without inducing any chemical change in the battery. For example, copper, stainless steel, aluminum, nickel, titanium, calcined carbon, a surface treated material of copper or stainless steel with carbon, nickel, titanium, silver or the like, an aluminum-cadmium alloy, etc. may be used. Further, similarly to the positive electrode current collector, the negative electrode current collector may form fine irregularities on its surface to increase the adhesion strength of the negative electrode active material, and it can be used in various shapes such as such as a film, a sheet, a foil, a net, a porous body, a foamed body, a non-woven fabric, etc.

Meanwhile, the separator is interposed between the positive electrode and the negative electrode, and an insulating thin film having high ion permeability and mechanical strength is used. A pore diameter of the separator is generally 0.01 to 10 μm, and a thickness thereof is generally 5 to 300 μm. For example, there may be used olefin-based polymers such as polypropylene, which is chemically resistant and hydrophobic; a sheet or a non-woven fabric made of glass fiber, polyethylene or the like may be used as an example of the separator. When a solid electrolyte such as a polymer is used as the electrolyte, the solid electrolyte may also serve as a separator.

The non-aqueous electrolytic solution is composed of a non-aqueous electrolyte and a lithium salt. As the non-aqueous electrolyte, non-aqueous organic solvents, organic solid electrolytes, inorganic solid electrolytes, and the like are used, but the present disclosure is not limited thereto.

As examples of the non-aqueous organic solvent, there may be mentioned non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Further, examples of the organic solid electrolyte include polyethylene derivatives, polyethylene oxide derivatives, polypropylene oxide derivatives, phosphoric acid ester polymers, agitation lysine, polyester sulfide, polyvinyl alcohols, polyvinylidene fluoride, and polymers containing ionic dissociation groups.

Further, examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

Further, the lithium salt is a material that is readily soluble in the non-aqueous electrolyte. Examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, imides, and the like.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the unit electrolyte. If necessary, in order to impart incombustibility, the electrolyte may further include halogen-containing solvents, such as carbon tetrachloride and ethylene trifluoride. Furthermore, in order to improve high-temperature storage characteristics, the electrolyte may further include carbon dioxide gas, and may further include fluoro-ethylene carbonate (FEC), propene sultone (PRS), etc.

In one specific example, a lithium salt such as $LiPF_6$, $LiClO_4$, $LiBF_4$, and $LiN(SO_2CF_3)_2$ is added to a mixed solvent of a cyclic carbonate of EC or PC which is a high-dielectric solvent and a linear carbonate of DEC, DMC or EMC which is a low viscosity solvent to thereby prepare a lithium salt-containing non-aqueous electrolyte.

Meanwhile, according to another aspect of the present disclosure, there is provided a battery module including the lithium secondary battery as a unit battery, a battery pack including the battery module, and a device including such a battery pack as a power source.

Here, examples of the device may be mentioned an electric vehicle, a hybrid electric vehicle, a plug-in hybrid electric vehicle or a system for power storage, but are not limited thereto.

The invention will be described in more detail by way of the following examples. However, these examples are presented for illustrative purposes only, and the scope of the present disclosure is not limited thereto.

Example 1: Preparation of Multilayer Electrode—Preparation of Two-Layer Electrode Based on 100 parts by weight of a negative electrode active material which is a graphite mixture of artificial graphite and natural graphite in a weight ratio of 90:10, 1 part by weight of a carbon black as a conductive material, 3 parts by weight of polyvinylidene fluoride as a first binder and 1.1 parts by weight of CMC as a thickener were mixed, to which water was added as a solvent to prepare a first negative electrode slurry.

Based on 100 parts by weight of a negative electrode active material in which a graphite mixture of artificial graphite and natural graphite in a weight ratio of 90:10, and a silicon-based oxide (SiO) were mixed in a weight ratio of 94:6, 1.5 part by weight of carbon black as a conductive material, 1.6 parts by weight of styrene-butadiene rubber (SBR) as a second binder and 1.1 parts by weight of CMC as a thickener were mixed, to which water was added as a solvent to prepare a second negative electrode slurry.

The first and second negative electrode slurries were simultaneously discharged onto the copper foil through the respective discharge parts of the die having two discharge parts. Thus, the first negative electrode slurry and the second negative electrode slurry were simultaneously coated onto the copper foil at a thickness ratio of 5:5 and applied to a total thickness of 300 μm. Thereafter, the resultant was dried and pressed to prepare a negative electrode.

Example 2: Preparation of Multilayer Electrode—Preparation of Two-Layer Electrode Based on 100 parts by weight of a negative electrode active material which is a graphite mixture of artificial graphite and natural graphite in a weight ratio of 90:10, 1 part by weight of a carbon black as a conductive material, 2.6 parts by weight of polyvinylidene fluoride as a first binder and 1.1 parts by weight of CMC as a thickener were mixed, to which water was added as a solvent to prepare a first negative electrode slurry.

Based on 100 parts by weight of a negative electrode active material in which a graphite mixture of artificial graphite and natural graphite in a weight ratio of 90:10, and a silicon-based oxide (SiO) were mixed in a weight ratio of 96:4, 1.5 part by weight of carbon black as a conductive material, 2.0 parts by weight of styrene-butadiene rubber (SBR) as a second binder and 1.1 parts by weight of CMC as a thickener were mixed, to which water was added as a solvent to prepare a second negative electrode slurry.

The first and second negative electrode slurries were simultaneously discharged onto the copper foil through the respective discharge parts of the die having two discharge parts. Thus, the first negative electrode slurry and the second negative electrode slurry were simultaneously coated onto the copper foil at a thickness ratio of 5:5 and applied to a total thickness of 300 μm. Thereafter, the resultant was dried and pressed to prepare a negative electrode.

Comparative Example 1: Preparation of Monolayer Electrode

Based on 100 parts by weight of a negative electrode active material in which a graphite mixture of artificial graphite and natural graphite in a weight ratio of 90:10, and a silicon-based oxide (SiO) were mixed in a weight ratio of 97:3, 1.5 part by weight of carbon black as a conductive material, 2.3 parts by weight of polyvinylidene fluoride as a binder and 1.1 parts by weight of CMC as a thickener were mixed, to which water was added as a solvent to prepare a second negative electrode slurry.

The negative electrode slurries were coated onto the copper foil and applied to a thickness of 300 μm. Thereafter, the resultant was dried and pressed to prepare a negative electrode.

Experimental Example 1: Evaluation of Adhesion Force

The negative electrode obtained through each of the above Examples and Comparative Examples was cut into 70 mm (length)×25 mm (width), and the prepared negative electrode and separator were laminated under the conditions of 70° C. and 4 MPa using a press to prepare a specimen. The prepared specimen was fixed to a glass plate using a double-sided tape, and the negative electrode was placed so as to face the glass plate. The separation membrane portion of the specimen was peeled off at an angle of 180° at a rate of 25 mm/min at 25° C., and the strength was measured.

The adhesion force of each electrode was evaluated through the peel strength, and the evaluation results are summarized in Table 1 below. This peel strength evaluation was repeated ten times, and the range of the evaluation results repeated ten times is shown in Table 1 below.

TABLE 1

| Example | Adhesion force (peel strength; gf/20 mm) |
| --- | --- |
| Example 1 | 36-38 |
| Example 2 | 28-30 |
| Comparative Example 1 | 18-23 |

Referring to Table 1, it was confirmed that the electrode of Examples exhibited excellent adhesion force as compared with the electrode of Comparative Example. In addition, it was confirmed that since the content of the silicon-based active material in the entire electrode composition is the same, the electrodes of Examples exhibit rate characteristic during discharge at the level equal to or higher than Comparative Example, together with such excellent adhesive force.

EXPLANATION OF SYMBOLS

10: die having one discharge part
11, 110: electrode current collector
12: layer of electrode active material slurry
100: die having a plurality of discharge parts
120: layer of the first electrode active material slurry
130: layer of the second electrode active material slurry
140: layer of the third electrode active material slurry
150: layer of the fourth electrode active material slurry

The invention claimed is:

1. A multilayer electrode comprising an electrode current collector; and a plurality of electrode active material layers which are sequentially coated on one surface or both surfaces of the electrode current collector,
   wherein the plurality of electrode active material layers each include a carbon-based active material, a binder, and a silicon-based active material,
   wherein in two electrode active material layers among the plurality of electrode active material layers based on a direction of formation of the plurality of electrode active material layers, a content of the carbon-based active material in the electrode active material layer located closer to the electrode current collector is larger than a content of the carbon-based active material in the electrode active material layer located farther away from the electrode current collector,
   wherein a content of the silicon-based active material in the electrode active material layer located farther away from the electrode current collector is larger than a content of the silicon-based active material in the electrode active material layer located closer to the electrode current collector, and
   wherein the electrode active material layer located farther away from the electrode current collector includes a carbon-based active material in a reduced amount of 80 to 98% based on a total weight content of the carbon-based active material which is contained in the electrode active material layer located closer to the electrode current collector.

2. The multilayer electrode of claim 1, wherein a content of the binder in the electrode active material layer located closer to the electrode current collector are larger than a content of the binder in the electrode active material layer located farther away from the electrode current collector.

3. The multilayer electrode of claim 1, wherein the carbon-based active material includes at least one selected from the group consisting of artificial graphite, natural graphite, hard carbon, soft carbon, carbon black, acetylene black, Ketjen black, Super-P, graphene and fibrous carbon.

4. The multilayer electrode of claim 1, wherein the silicon-based active material includes at least one selected from the group consisting of $SiO_x$ ($0 \leq x < 2$), pure silicon (Si), and a silicon (Si)-alloy.

5. The multilayer electrode of claim 1, wherein the binder includes at least one selected from the group consisting of polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, and fluorine rubber.

6. The multilayer electrode of claim 1, wherein the plurality of electrode active material layers are two to four electrode active material layers.

7. The multilayer electrode of claim 6, wherein the multilayer electrode includes n electrode active material layers (wherein n is an integer of 2 to 4) each including the carbon-based active material and the binder in an amount that gradually decreases the farther away the electrode active material layer is from the electrode current collector; and a $n^{th}$ electrode active material layer includes the binder in an amount of 0% to 99% based on the respective content (% by weight) of the binder contained in the $(n-1)^{th}$ electrode active material layer.

8. The multilayer electrode of claim 7, wherein the n electrode active material layers each include the silicon-based active material in an amount that gradually increases the farther away the electrode active material layer is from the electrode current collector; and the $n^{th}$ electrode active material layer includes the silicon-based active material in an amount of greater than 100% based on the respective content (% by weight) of the silicon-based active material in the $(n-1)^{th}$ electrode active material layer.

9. The multilayer electrode of claim 1, wherein the multilayer electrode is a negative electrode.

10. A lithium secondary battery comprising:
an electrode assembly including a positive electrode, a negative electrode including the multilayer electrode of claim 1, and a separator interposed between the positive electrode and the negative electrode;
a non-aqueous electrolyte for impregnating the electrode assembly; and
a battery case incorporating the electrode assembly and the non-aqueous electrolyte.

11. A battery module comprising the lithium secondary battery of claim 10 as a unit battery.

12. The multilayer electrode of claim 1, wherein the electrode active material layer located farther away from the electrode current collector includes the carbon-based active material in the reduced amount of 90 to 97% based on the total weight content of the carbon-based active material which is contained in the electrode active material layer located closer to the electrode current collector.

13. The multilayer electrode of claim 1,
wherein the carbon-based active material in the electrode active material layer located closer to the electrode current collector comprises artificial graphite, and the carbon-based active material in the electrode active material layer located farther away from the electrode current collector comprises natural graphite.

14. The multilayer electrode of claim 1,
wherein the carbon-based active material in the electrode active material layer located closer to the electrode current collector comprises artificial graphite, and
the artificial graphite is the only carbon-based active material included in the electrode active material layer located closer to the electrode current collector.

15. The multilayer electrode of claim 1, wherein the two electrode material layers are adjacent to each other in the direction of formation of the plurality of electrode active material layers.

* * * * *